United States Patent
Nakazawa et al.

(10) Patent No.: US 7,021,298 B2
(45) Date of Patent: Apr. 4, 2006

(54) INTERNAL EGR PARAMETER ESTIMATING DEVICE FOR INTERNAL COMBUSTION ENGINE

(75) Inventors: Takashi Nakazawa, Kawasaki (JP); Takahisa Koseki, Novi, MI (US); Hatsuo Nagaishi, Zushi (JP); Takeshi Suzuki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/066,618

(22) Filed: Feb. 28, 2005

(65) Prior Publication Data

US 2005/0229909 A1    Oct. 20, 2005

(30) Foreign Application Priority Data

Apr. 20, 2004  (JP)  ............................. 2004-124025
Apr. 20, 2004  (JP)  ............................. 2004-124032

(51) Int. Cl.
    F02B 47/08    (2006.01)
(52) U.S. Cl. ............................... 123/568.14; 123/90.15

(58) Field of Classification Search ........... 123/568.14, 123/568.11, 58.8, 90.15; 73/117.3, 118.1, 73/118.2
See application file for complete search history.

(56) References Cited

U.S. PATENT DOCUMENTS 6,412,458 B1 *  7/2002  Kawasaki et al. ........ 123/90.15
6,840,235 B1 *  1/2005  Koseki et al. .......... 123/568.14

FOREIGN PATENT DOCUMENTS

JP    2001-221105 A    8/2001

* cited by examiner

*Primary Examiner*—Mahmoud Gimie
(74) *Attorney, Agent, or Firm*—Shinjyu Global IP Counselors

(57) ABSTRACT

An internal EGR parameter estimating device is configured to estimate the internal EGR quantity based on the quantity of blow-by gas that blows by during an overlap period when both the intake valve(s) and the exhaust valve(s) are open. The blow-by gas quantity is calculated based on the intake air pressure and the exhaust gas pressure during the overlap period and the effective cross sectional area opening formed by the intake and exhaust valves. The overlap period is divided into intervals of a prescribed period and the interval cross sectional area opening during each interval is calculated.

18 Claims, 10 Drawing Sheets

| n | 1 | 2 | 3 | | N-1 | N |
|---|---|---|---|---|---|---|
| VAREAI | a1 | a2 | a3 | · · · | aN-1 | aN |
| VAREAE | b1 | b2 | b3 | · · · | bN-1 | bN |

INTERNAL EGR PARAMETER ESTIMATING DEVICE FOR INTERNAL COMBUSTION ENGINE

CROSS-REFERENCE TO RELATED APPLICATIONS

This application claims priority to Japanese Patent Application Nos. 2004-124025 and 2004-124032. The entire disclosures of Japanese Patent Application Nos. 2004-124025 and 2004-124032 are hereby incorporated herein by reference.

BACKGROUND OF THE INVENTION

1. Field of the Invention

The present invention generally relates to an internal EGR parameter estimating device for an internal combustion engine. More specifically, the present invention relates to a technology for calculating the quantity of exhaust gas that blows between the exhaust side and the intake side during the overlap period when both the intake valve and the exhaust valve are open (i.e., the blow-by gas quantity) in a simple and accurate fashion.

2. Background Information

Conventionally, engines are configured to execute exhaust gas recirculation (hereinafter called "EGR") whereby a portion of the exhaust gas is returned to the cylinders in order to suppress the generation of nitrous oxides (NOx) resulting from higher combustion temperatures.

There are basically two types of EGR arrangements: an external EGR in which the exhaust gas is recirculated through an EGR pipe connected between an exhaust pipe and an intake pipe; and an internal EGR in which the exhaust gas is recirculated without using the EGR pipe. One example of an EGR estimation device is disclosed in Japanese Laid-Open Patent Publication No. 2001-221105 in which the quantity of gas recirculated by internal EGR estimated. The device disclosed in that publication is configured to calculate a basic value of the internal EGR quantity based on the engine rotational speed, the exhaust valve close timing, and the assumption of operating conditions under which the open period of the intake valve and the open period of the exhaust valve do not overlap. When the open periods of the intake and exhaust valves overlap, the internal EGR quantity is calculated by adding to the basic EGR quantity an overlap compensation value that is calculated based on such factors as the amount of overlap and the intake air pressure.

In view of the above, it will be apparent to those skilled in the art from this disclosure that there exists a need for an improved internal EGR parameter estimating device. This invention addresses this need in the art as well as other needs, which will become apparent to those skilled in the art from this disclosure.

SUMMARY OF THE INVENTION

It has been discovered that in the device described above, in which an overlap compensation valve is added to a basic value, has some problems. Although the intake air pressure and other factors are taken into account when calculating the compensation value, a single unique compensation value cannot be determined for a given overlap amount when the effect of the engine rotational speed, air-fuel ratio of the fuel-air mixture, and other factors are taken into consideration in order to improve the accuracy of the calculation. As a result, it becomes necessary to include a large number of adaptive steps. Furthermore, even if one is successful in adapting, re-adaptation is not easily accomplished when the profiles of the cams and/or the shapes of the ports have changed.

The present invention was developed investigating an internal EGR quantity estimating device that divides the internal EGR gas into the exhaust gas that blows from the exhaust side to the intake side during the overlap period (hereinafter called "blow-by gas") and the exhaust gas that remains inside the cylinder even after the exhaust valve closes (hereinafter called "residual gas") and that then calculates the internal EGR quantity as the sum of those two exhaust gas quantities. The quantity of blow-by gas is calculated by assuming that the constrictions formed in the intake and exhaust ports act as an ideal nozzle during the overlap period and applying the law of conservation of energy. Meanwhile, the quantity of residual gas is calculated by estimating the temperature and pressure inside the cylinder when the exhaust valve closes and substituting the estimated values into an equation of state for gases. When calculating the quantity of blow-by gas, the effective cross sectional area opening of the nozzle is calculated by determining the instantaneous cross sectional area opening of the intake port and the instantaneous cross sectional area opening of the exhaust port at a plurality of points in time, selecting the smaller of the two cross sectional areas corresponding to each point in time as the effective instantaneous cross sectional area opening, and integrating the instantaneous cross sectional area openings with respect to time. By creating and storing a map of data indicating the relationship between the amount of overlap and the integrated cross sectional area in advance, the actual amount of overlap can be detected while the engine is operating (i.e., the vehicle in which the engine is installed is being driven) and used to obtain the integrated cross sectional area, i.e., the effective cross sectional area opening, from the map.

However the following problem was discovered regarding the calculation of the effective cross sectional area opening in such a device. Since the relationship between the amount of overlap and the integrated cross sectional area is identified in advance and stored as a map, if the valve clearance changes (the clearances of the intake valve and the exhaust valve are also sometimes different) and causes the effective instantaneous cross sectional area openings to change, it is difficult to reflect the effect of the change in the calculated effective cross sectional area opening. Consequently, the accuracy of the calculated effective cross sectional area opening is insufficient and the blow-by gas quantity cannot be calculated accurately.

One object of the present invention is to calculate the effective cross sectional area opening accurately, and thereby, calculate the blow-by gas quantity accurately when estimating the internal EGR quantity. In other words, an object of the present invention is to calculate the blow-by gas quantity during the overlap period in a simple and accurate manner, and thereby, estimate the internal EGR quantity accurately.

In order to achieve the above mentioned objects and other objects of the present invention, an internal EGR parameter estimating device basically comprises an interval calculating section, an interval cross sectional area opening calculating section, a cross sectional area opening integrating section and an effective cross sectional area opening calculating section. The interval calculating section is configured to set a prescribed time period and to divide the prescribed time period into a plurality of intervals that includes an overlap period in which an intake valve and an exhaust valve are both open in a single cylinder. The interval cross sectional area opening calculating section is configured to calculate an interval cross sectional area opening of a blow-by gas passage formed between an intake port and an exhaust port during the overlap period for each of the intervals based on a predetermined valve operating characteristic value. The cross sectional area opening integrating section is configured to integrate the interval cross sectional area openings over the overlap period. The effective cross sectional area opening calculating section is configured to calculate an effective cross sectional area opening indicating a effective cross sectional area opening of the blow-by gas passage over the overlap period based on integration of the interval cross sectional area openings.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
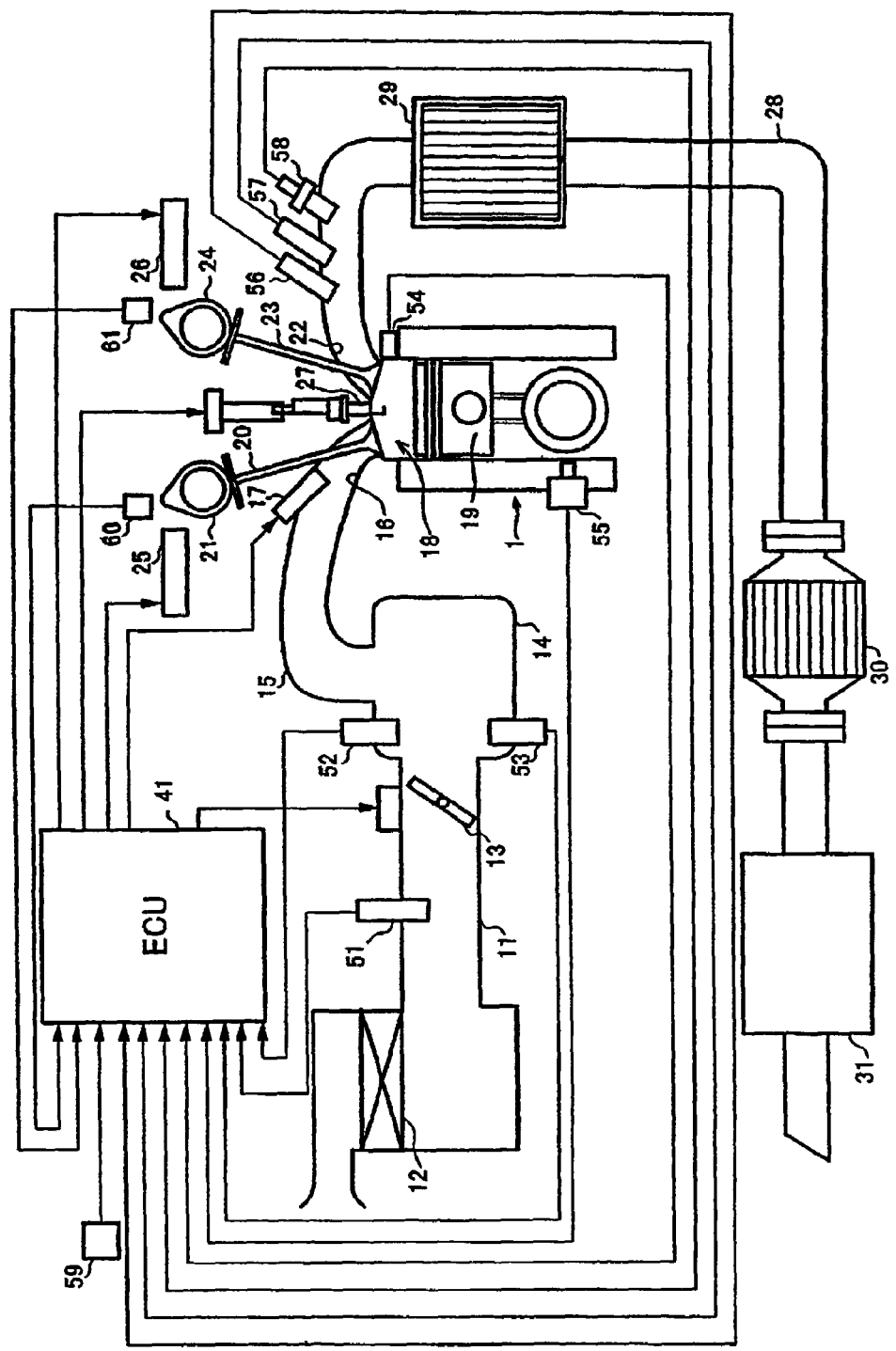
FIG. 1 is a simplified overall schematic view of an internal combustion engine provided with an internal EGR quantity estimating device in accordance with preferred embodiments of the present invention.

Referring initially to FIG. 1, the main features of an internal combustion engine 1 is illustrated that is provided with an internal EGR parameter estimating device in accordance with a preferred embodiment of the present invention. The internal EGR parameter estimating device of the present invention offers a blow-by gas quantity calculating device or section and an internal EGR quantity estimating device or section for the engine 1. As explained below, the blow-by gas calculating device in accordance with the present invention calculates the quantity of blow-by gas of the engine 1, i.e., the quantity of exhaust gas that blows between the exhaust side and the intake side during an overlap period in which intake and exhaust valves are both open. The blow-by gas quantity is calculated by detecting the intake air pressure during the overlap period and the exhaust gas pressure during the overlap period, calculating a substantial cross sectional area opening of the blow-by gas passage formed by the intake valve and the exhaust valve (hereinafter called "effective cross sectional area opening"), and calculating the blow-by gas quantity based on at least the detected intake air pressure and the detected exhaust gas pressure and the calculated effective cross sectional area opening.

In one preferred mode of the present invention, the blow-by gas quantity is calculated using the intake air pressure detected at a substantially central point in time during the overlap period as a representative intake air pressure for the overlap period. In another preferred mode of the invention, the blow-by gas quantity is calculated using the intake air pressure detected at a point in time when a first cross sectional area opening formed by the intake valve and a second cross sectional area opening formed by the exhaust valve are equal as a representative intake air pressure for the overlap period. The engine internal EGR quantity estimating device in accordance with the present invention includes a blow-by gas quantity calculating device and is configured to calculate the internal EGR quantity of the engine 1 based on the blow-by gas quantity calculated by the blow-by gas calculating device as explained below.

As seen in FIG. 1, the engine 1 has an air intake passage 11 with an air cleaner 12 mounted at a position near the entrance of in the air intake passage 11. The air cleaner 12 is configured and arranged to remove dust and other fine particles from the intake air. An electronically controlled throttle valve 13 is installed inside the air intake passage 11 at a position downstream of the air cleaner 12. A surge tank 14 is installed downstream of the throttle valve 13 with a plurality of runners 15 being attached to the surge tank 14 to form an intake manifold. The intake air inside the surge tank 14 flows through the runners 15 and into intake ports 16 formed in a cylinder head to enter a plurality of cylinders (only one shown). A fuel injector 17 is installed in each of the intake ports 16 for injecting atomized fuel into the intake air that is being supplied to a combustion chamber 18 of each of the cylinders.

The combustion chamber 18 of each cylinder is formed as the space between the cylinder head and the piston 19 in the main body of the engine 1. The intake port 16 communicates with the combustion chamber 18 on one side of the combustion chamber 18 with respect to the center axis of the cylinder and an exhaust port 22 communicates with the combustion chamber 18 on the opposite side from the intake port 16. Each of the intake ports 16 is opened and closed by an intake valve 20. The intake valves 20 are each driven by an intake cam 21 in a conventional manner. Similarly, each of the exhaust ports 22 is opened and closed by an exhaust valve 23. The exhaust valves 23 are each driven by an exhaust cam 24 in a conventional manner. A variable intake valve mechanism 25 is provided with respect to the intake cams 21 and a variable exhaust valve mechanism 26 is provided with respect to the exhaust cams 22. The variable valve mechanisms 25 and 26 are configured and arranged to vary the phase of the intake cams 21 and the exhaust cams 24 with respect to the respective cam shafts so that the operating characteristics of the intake valves 20 and the exhaust valves 23 can be varied. Any conventional variable valve mechanism can be utilized as the variable valve mechanisms 25 and 26. For example, the conventional variable valve mechanism includes, but not limited to, hydraulically operated and solenoid operated valve mechanisms. In this embodiment, the variable valve mechanisms 25 and 26 are preferably configured and arranged to vary the open and close timing (i.e., the valve timing) of the intake valves 20 and the exhaust valves 23 so that the overlap period during which both the intake valve 20 and the exhaust valve 23 of a corresponding cylinder are open (hereinafter referred to as "overlap period") can be changed. A spark plug 27 is installed in the cylinder head and arranged to face the approximate center of an upper portion of the combustion chamber 18.

As seen in FIG. 1, the engine 1 has an exhaust passage 28 with a first catalytic converter 29 installed in the exhaust passage 28 immediately downstream of the exhaust manifold and a second catalytic converter 30 is installed immediately downstream of the first catalytic converter 29. The exhaust gas that exits the exhaust ports 22 is configured to pass through the first and second catalytic converters 29 and 30 and a muffler 31 before being discharged to the atmosphere.

The engine 1 is provided with an engine control unit ("ECU") 41 as seen in FIG. 1. The engine control unit 41 is configured to control the operation of the injectors 17, the variable valve mechanisms 25 and 26 and the sparkplugs 27. The engine control unit 41 is configured to receive various input signals from various sensors provided in the engine. More specifically, the engine control unit 41 is configured to receive various input signals from the following devices or sensors: an air flow meter 51, a pressure sensor 52, an intake air temperature sensor 53, a coolant temperature sensor 54, a crank angle sensor 55, a pressure sensor 56, a temperature sensor 57, an oxygen sensor 58, an accelerator pedal or throttle opening sensor 59 and a pair of cam sensors 60 and 61. The intake air quantity is detected by the air flow meter 51, which outputs a signal to the engine control unit 41 that is indicative of the intake air quantity. The intake air pressure is detected by the pressure sensor 52, which outputs a signal to the engine control unit 41 that is indicative of the intake air pressure. The intake air temperature Tin is detected by the intake air temperature sensor 53, which outputs a signal indicative of the intake air temperature. Alternatively, the intake air temperature sensor for detecting the intake air temperature is integrally provided with the air flow meter 51. The engine coolant temperature is detected by the coolant temperature sensor 54, which outputs a signal to the engine control unit 41 that is indicative of the coolant temperature. The crank angle is detected by the crank angle sensor 55, which outputs signals to the engine control unit 41 that are indicative of the unit crank angle and the reference crank angle. The engine control unit 41 uses the detected unit crank angle and the reference crank angle to calculate the engine rotational speed NE. The exhaust gas pressure is detected by the pressure sensor 56, which outputs signals to the engine control unit 41 that are indicative of the exhaust gas pressure. The exhaust gas temperature is detected by the temperature sensor 57, which outputs signals to the engine control unit 41 that are indicative of the exhaust gas temperature. The air-fuel ratio is detected by the oxygen sensor 58, which outputs signals to the engine control unit 41 that are indicative of the air-fuel ratio. The accelerator position is detected by the accelerator pedal or throttle opening sensor 59, which outputs signals to the engine control unit 41 that are indicative of the accelerator position. The intake and exhaust cam angles are detected by the cam sensors 60 and 61, respectively, which output signals to the engine control unit 41 that are indicative of the intake and exhaust cam angles. These intake and exhaust cam angle signals enable the actual phase difference between the intake and exhaust cams 21 and 24 of the camshafts to be detected. The engine control unit 41 sets control quantities for the aforementioned devices based on these various input signals.

The engine control unit 41 preferably includes a microcomputer with an intake air pressure estimation program that estimates the intake air pressure as discussed below. The engine control unit 41 can also include other conventional components such as an input interface circuit, an output interface circuit, and storage devices such as a ROM (Read Only Memory) device and a RAM (Random Access Memory) device. The microcomputer of the engine control unit 41 is programmed to control the intake air pressure estimating processing. The memory circuit stores processing results and control programs that are run by the processor circuit. The engine control unit 41 is operatively coupled to the various sensors and the devices of the engine in a conventional manner. The internal RAM of the engine control unit 41 stores statuses of operational flags and various control data. The internal ROM of the engine control unit 41 stores the maps and data for various operations. The engine control unit 41 is capable of selectively controlling any of the components of the control system in accordance with the control program. It will be apparent to those skilled in the art from this disclosure that the precise structure and algorithms for the engine control unit 41 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In this embodiment, the engine control unit 41 is configured to function as the internal EGR parameter estimating device of the engine 1. Thus, the engine control unit 41 can be consider to be an internal EGR quantity estimating device, an engine blow-by gas quantity calculating device, and an internal EGR effective cross sectional area opening calculating device. Now, the estimation of the internal EGR quantity MRES by the engine control unit 41 will now be described.

The engine control unit 41 is configured to divide the internal EGR quantity MRES into a blow-by gas quantity MRESOL, i.e., the quantity of exhaust gas that blows from the exhaust port 22 to the intake port 16 during the overlap period and a residual gas quantity MRESCYL, i.e., the quantity of exhaust gas that remains inside the cylinder even after the exhaust valve closes (hereinafter called "residual gas"). The engine control unit 41 is configured to calculate the internal EGR quantity MRES as the sum of the two calculated exhaust gas quantities MRESOL and MRESCYL as seen in equation (1).

$$MRES = MRESOL + MRESCYL \tag{1}$$

Figure 2:
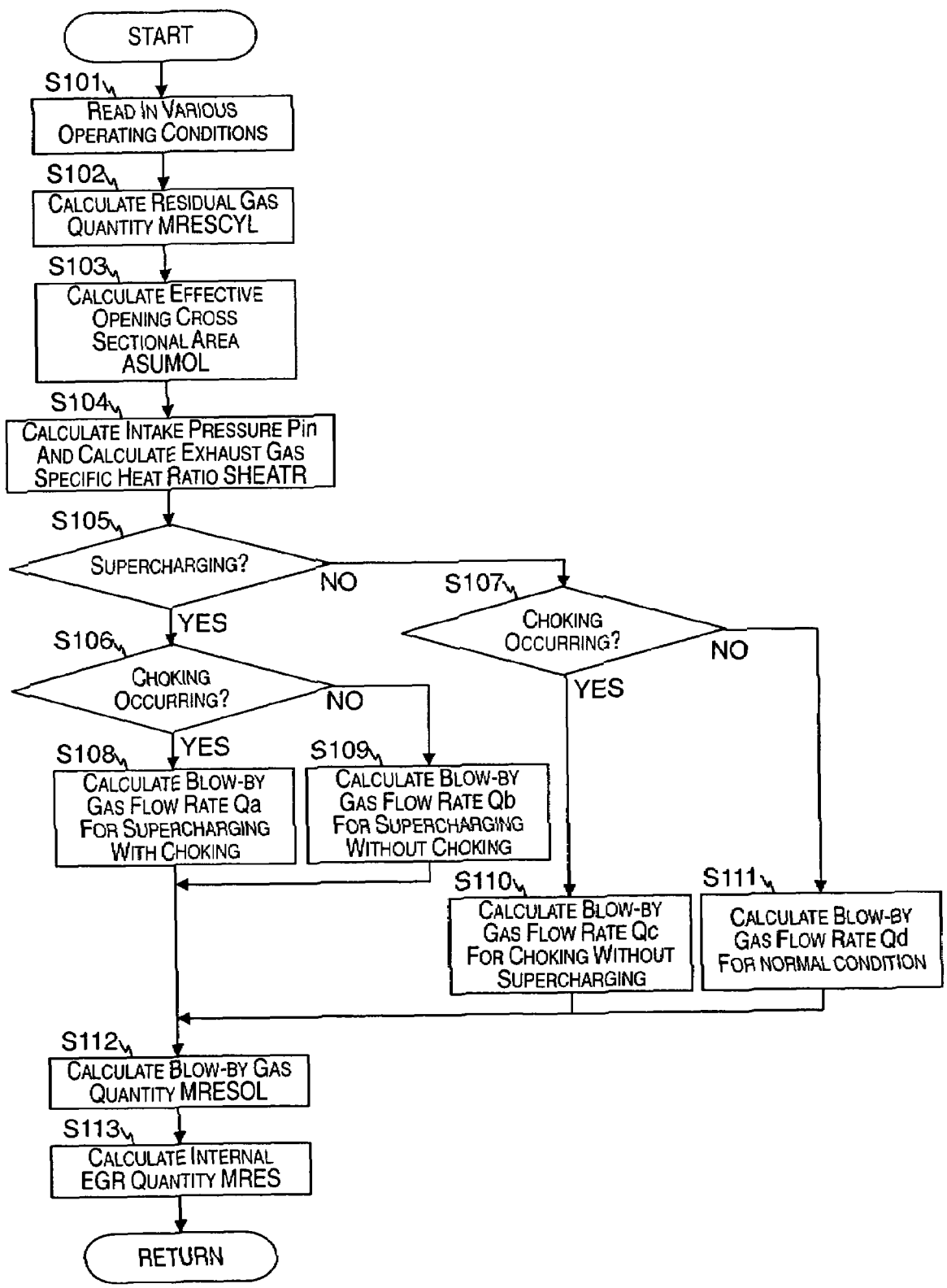
FIG. 2 is a flowchart of an internal EGR quantity estimating routine executed in the internal EGR quantity estimating device in accordance with the present invention.

FIG. 2 is a flowchart of a routine for estimating the internal EGR quantity MRES. This routine is repeated once per cycle in synchronization with the reference crank angle signal outputted by the crank angle sensor 55.

In step S101, the engine control unit 41 is configured to read in the engine rotational speed NE, the intake air pressure Pin, the intake air temperature Tin, the exhaust gas pressure Pex, the exhaust gas temperature Tex, and other operating conditions. Preferably, the manifold pressure Pmani is obtained by finding the average of a plurality of intake pressures detected by the pressure sensor 52 during the overlap period and corresponds to the static component of the actual manifold pressure existing during the overlap period, i.e., the portion of the manifold pressure that remains when the fluctuating component resulting from pulsation is removed.

In step S102, the engine control unit 41 engine control unit 41 is configured to calculate the residual gas quantity MRESCYL. More specifically, the engine control unit 41 calculates the volume (hereinafter called "cylinder volume") VEVC of the space defined by the cylinder head and the piston 19 at the exhaust valve close timing and the gas constant Rex of the exhaust gas corresponding to a target combustion equivalence ratio TFBYA. Then, based on the calculated cylinder volume VEVC and gas constant Rex and the temperature TEVC and the pressure PEVC inside the cylinder at the exhaust valve close timing, the engine control unit 41 calculates the residual gas quantity MRESCYL using the equation (2) shown below. The temperature TEVC and pressure PEVC inside the cylinder can be estimated based on the signals from the temperature sensor 57 and the pressure sensor 56, respectively, and the exhaust gas close timing can be detected based on the signal from the exhaust cam angle sensor.

$$MRESCYL = \left( \frac{PEVC \times VEVC}{Rex \times TEVC} \right) \tag{2}$$

In step S103, the engine control unit 41 calculates the effective cross sectional area opening ASUMOL. The effective cross sectional area opening ASUMOL is calculated by integrating the substantial instantaneous cross sectional area openings formed by the intake valve 20 and the exhaust valve 23 during the overlap period using an effective cross sectional area opening computing routine (described later).

Figure 16:
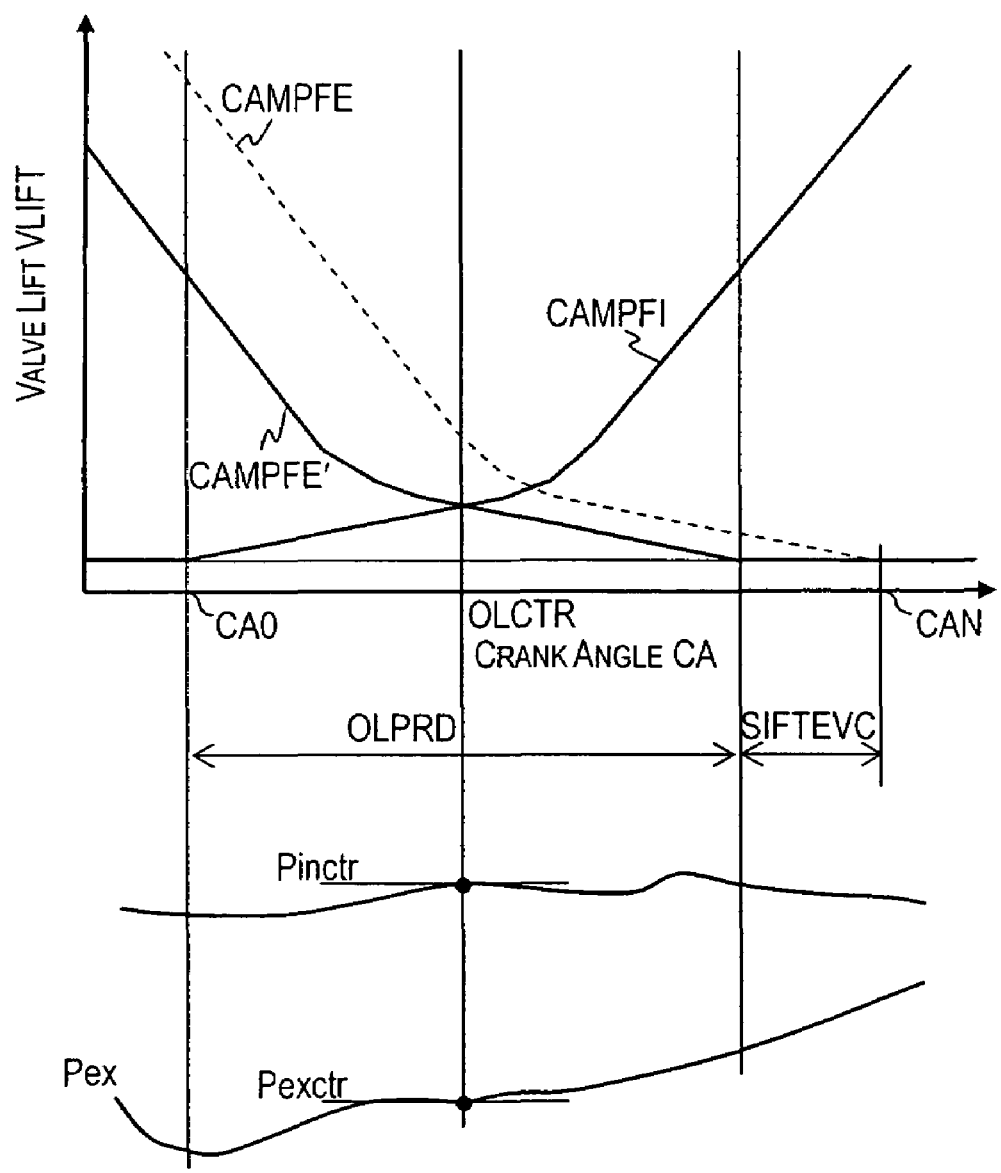
FIG. 16 is a graph that indicates the intake air pressure and the exhaust gas pressure at the overlap center timing OLCTR.

In step S104, the engine control unit 41 calcuates the intake pressure Pin. This intake pressure Pin is the actual intake pressure existing during the overlap period as determined by using an intake pressure detecting routine (described later), which corrects the detected manifold pressure Pmani in accordance with the amount of pressure change resulting from pulsation. In this embodiment, the intake air pressure Pin (=Pinctr of FIG. 16) is corresponding to the point in time when the cross sectional area opening formed in the intake port 16 by the intake valve 20 (hereinafter called the "first cross sectional area opening") and the cross sectional area opening formed in the exhaust port 22 by the exhaust valve 23 (hereinafter called the "second cross sectional area") become equal and this intake air pressure Pin is used as the representative intake air pressure for the overlap period. Also, in this embodiment, the crank angle OLCTR where the valve operating characteristic values CAMPFI and CAMPFE are equal (hereinafter called the "overlap center timing") is used as the point in time when said cross sectional area openings are equal. Furthermore, while it is preferred for the exhaust pressure Pex, too, to be a value corresponding to the overlap center timing OLCTR so as to align with the intake pressure Pin, in this embodiment the exhaust pressure Pex is approximated with the atmospheric pressure.

The present invention makes it possible to calculate the blow-by gas quantity accurately regardless of the operating conditions because the blow-by gas quantity is calculated using theoretical computations based on the intake and exhaust pressures existing during the overlap period and the effective cross sectional area opening. As a result, the internal EGR quantity can be calculated accurately regardless of the operating conditions. Additionally, since the intake air pressure corresponding to a prescribed timing during the overlap period is used as a representative intake air pressure when calculating the blow-by gas quantity, the computer processing load can be curbed. Furthermore, re-adaptation can be accomplished easily when a cam profile or port shape is changed.

Figure 3:
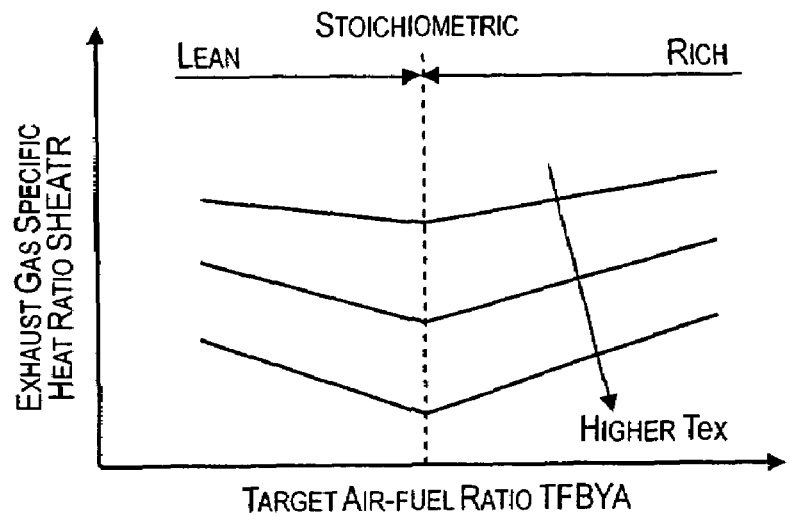
FIG. 3 is a map for setting the specific heat ratio of the exhaust gas that is used in the internal EGR quantity estimating device in accordance with the first embodiment of the present invention.

Also in step S104, the engine control unit 41 is configured to calculate the specific heat ratio SHEATR of the exhaust gas. The specific heat ratio SHEATR is calculated by searching a map (FIG. 3) that assigns specific heat ratios based on the target combustion equivalence ratio TFBYA and the exhaust gas temperature Tex. For a given constant exhaust gas temperature Tex, the calculated value of the specific heat ratio SHEATR is smallest at the stoichiometric air-fuel ratio and increases as the target combustion equivalence ratio increases or decreases from the stoichiometric value. Meanwhile, for any given fixed target combustion equivalence ratio TFBYA, whether rich or lean, the calculated specific heat ratio SHEATR decreases as the exhaust temperature Tex increases.

In step S105, the engine control unit 41 is configured to determine if the engine 1 is operating in a supercharged state. More specifically, the engine control unit 41 calculates the ratio PINBYEX of the intake air pressure Pin to the exhaust gas pressure Pex (i.e., Pin/Pex) and determines if the ratio PINBYEX is larger than 1. If the pressure ratio PINBYEX is larger than 1, the engine 1 is determined to be in a supercharged state and the engine control unit 41 proceeds to step S106. If the pressure ratio PINBYEX is less than or equal to 1, the engine 1 is determined not to be in a supercharged state and the engine control unit 41 proceeds to step S107.

Figure 4:
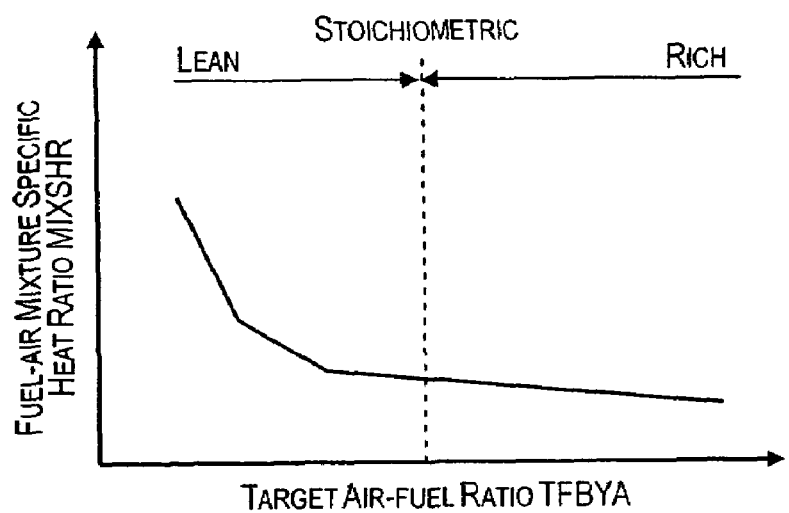
FIG. 4 is a map for setting the specific heat ratio of the fuel-air mixture that is used in the internal EGR quantity estimating device in accordance with the present invention.

In step S106, the engine control unit 41 is configured to determine if choking is occurring in the flow of fuel-air mixture that blows from the intake side to the exhaust side as a result of supercharging. More specifically, the engine control unit 41 calculates the specific heat ratio MIXSHR of the fuel-air ratio, calculates a first or high choke determination value SLCHOKEH and a second or low choke determination value SLCHOKEL by substituting the calculated specific heat ratio MIXSHR for the specific heat ratio SHEATR in the equations (3a) and (3b) shown below, and determining if the pressure ratio PINBYEX lies within the prescribed range for which the choke determination values SLCHOKEH and SLCHOKEL are the upper and lower limits. If the pressure ratio PINBYEX does not lie in the prescribed range, then choking is occurring and the engine control unit 41 proceeds to step S108. Meanwhile, if the pressure ratio PINBYEX lies in the prescribed range, then choking is not occurring and the engine control unit 41 proceeds to step S109. The specific heat ratio MIXSHR of the fuel-air mixture is calculated by searching a map (FIG. 4) that assigns specific heat ratios based on the target combustion equivalence ratio TFBYA. The calculated value of the specific heat ratio MIXSHR decreases as the target combustion equivalence ratio TFBYA.

$$SLCHOKEH = \left(\frac{2}{SHEATR+1}\right) \wedge \left(\frac{-SHEATR}{SHEATR-1}\right) \quad (3a)$$

-continued $$SLCHOKEL = \left(\frac{2}{SHEATR+1}\right) \wedge \left(\frac{SHEATR}{SHEATR-1}\right) \quad (3b)$$

In step S107, the engine control unit 41 is configured to determine if the choking is occurring in the flow of the exhaust gas blowing from the exhaust side to the intake side. More specifically, the engine control unit 41 calculates the specific heat ratio SHEATR of the exhaust gas and calculates the first and second choke determination values SLCHOKEH and SLCHOKEL based on the calculated specific heat ratio SHEATR using the equations (3a) and (3b). The engine control unit 41 then compares the pressure ratio PINBYEX to the choke determination values SLCHOKEH and SLCHOKEL. If the pressure ratio PINBYEX does not lie in the prescribed range, then choking is occurring and the engine control unit 41 proceeds to step S110. However, if the pressure ratio PINBYEX does lie in the prescribed range, then choking is not occurring and the engine control unit 41 proceeds to step S111. The specific heat ratio SHEATR is calculated by searching map (FIG. 3) that assigns specific heat ratios based on the target combustion equivalence ratio TFBYA and the exhaust gas temperature Tex. For a given constant exhaust gas temperature Tex, the calculated value of the specific heat ratio SHEATR is smallest at the stoichiometric air-fuel ratio and increases as the target combustion equivalence ratio increases or decreases from the stoichiometric value. Meanwhile, for any given fixed target combustion equivalence ratio TFBYA, whether rich or lean, the calculated specific heat ratio SHEATR decreases as the exhaust temperature Tex increases.

In step S108, the engine control unit 41 is configured to calculate the blow-by gas flow rate Qa for supercharging with choking using the equations (4a) and (4b) shown below, and then sets the calculated value as the blow-by gas flow rate MRESOLtmp. In the equations (4a) and (4b), the term Tin is the intake air temperature and the term Rin is the gas constant of the intake air.

$$MRSOLPC = \sqrt{\left(MIXSHR \times \left(\frac{2}{MIXSHR+1}\right)\right) \wedge \left(\frac{MIXSHR+1}{MIXSHR-1}\right)} \quad (4a)$$

$$Qa = MRESOLtmp = \sqrt{\left(\frac{1}{Rin \times Tin}\right)} \times Pin \times MRSOLPC \quad (4b)$$

In step S109, the engine control unit 41 is configured to calculate the blow-by gas flow rate Qb for supercharging without choking using the equations (5a) and (5b) shown below, and then sets the calculated value as the blow-by gas flow rate MRESOLtmp.

$$MRSOLPT = \sqrt{\left(\frac{MIXSHR}{MIXSHR-1}\right) \times \left(PINBYEX \wedge \left(\frac{-2}{MIXSHR}\right) - PINBYEX \wedge \left(\frac{-(MIXSHR+1)}{MIXSHR}\right)\right)} \quad (5a)$$

$$Qb = MRESOLtmp = -1.4 \times \sqrt{\left(\frac{1}{Rin \times Tin}\right)} \times Pin \times MRSOLPT \quad (5b)$$

In step S110, the engine control unit 41 is configured to calculate the blow-by gas flow rate Qc for choking without supercharging using the equations (6a), (6b) and (6c) shown below, and then sets the calculated value as the blow-by gas flow rate MRESOLtmp or Vblow.

$$MRSOLD = \sqrt{\left(\frac{1}{Rex \times Tex}\right)} \quad (6a)$$

$$MRSOLPC = \sqrt{\left(SHEATR \times \left(\frac{2}{SHEATR+1}\right)\right) \wedge \left(\frac{SHEATR+1}{SHEATR-1}\right)} \quad (6b)$$

$$Qc = Vblow = MRESOLtmp = Pex \times MRSOLD \times MRSOLPC \quad (6c)$$

In step S111, the engine control unit 41 calculates the blow-by gas flow rate Qd for normal conditions using the equations shown below and sets the calculated value as the blow-by gas flow rate MRESOLtmp.

$$MRSOLD = \sqrt{\left(\frac{1}{Rex \times Tex}\right)} \qquad (7a)$$

$$MRSOLP = \sqrt{\left(\frac{SHEATR}{SHEATR-1}\right) \times \left(PINBYEX \bigwedge \left(\frac{2}{SHEATR}\right) - PINBYEX \bigwedge \left(\frac{(SHEATR+1)}{SHEATR}\right)\right)} \qquad (7b)$$

$$Qd = MRESOLtmp = 1.4 \times Pex \times MRSOLD \times MRSOLP \qquad (7c)$$

In step S112, the engine control unit 41 is configured to calculate the blow-by gas quantity MRESOL based on the calculated blow-by gas flow rate MRESOLtmp using the equation (8) below.

$$MRESOL = \left(\frac{MRESOLtmp \times 60 \times ASUMOL}{NE \times 360}\right) \qquad (8)$$

In step S113, the engine control unit 41 is configured to calculate the internal EGR quantity MRES based on the calculated residual gas quantity MRESCYL and blow-by gas quantity MRESOL using the aforementioned equation (1).

The engine control unit 41 engine control unit 41 is configured to calculate the internal EGR ratio MRESFR based on the calculated internal EGR quantity MRES using the equation (9) shown below and then applies the calculated internal EGR ratio MRESFR in its fuel injection control of the injector 17 and its ignition control of the spark plug 27. In the equation (9) below, the term MACYL is the intake air quantity per cycle detected by the air flow meter 51, while and the term TFBYA is the target air-fuel ratio.

$$MRESFR = \frac{MRES}{\left(MRES + MACYL \times \left(1 + \frac{TFBYA}{14.7}\right)\right)} \qquad (9)$$

The computation of the effective cross sectional area opening will now be explained.

Figure 7:
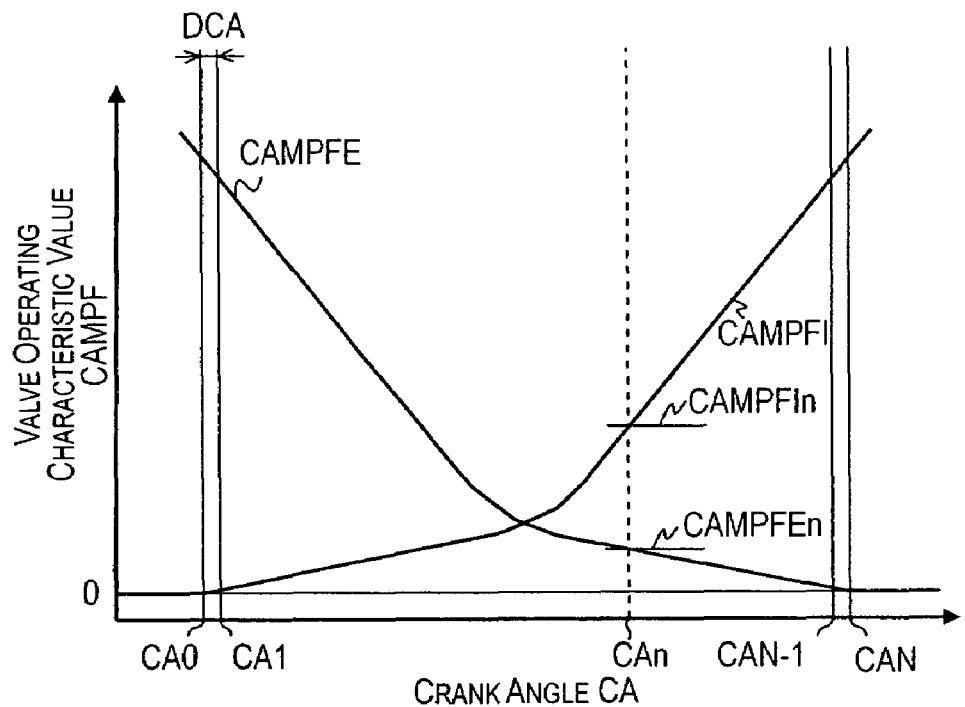
FIG. 7 is a graph that plots the valve operating characteristic value versus the crank angle and that is used in the internal EGR quantity estimating device in accordance with the present invention.
Figure 8:
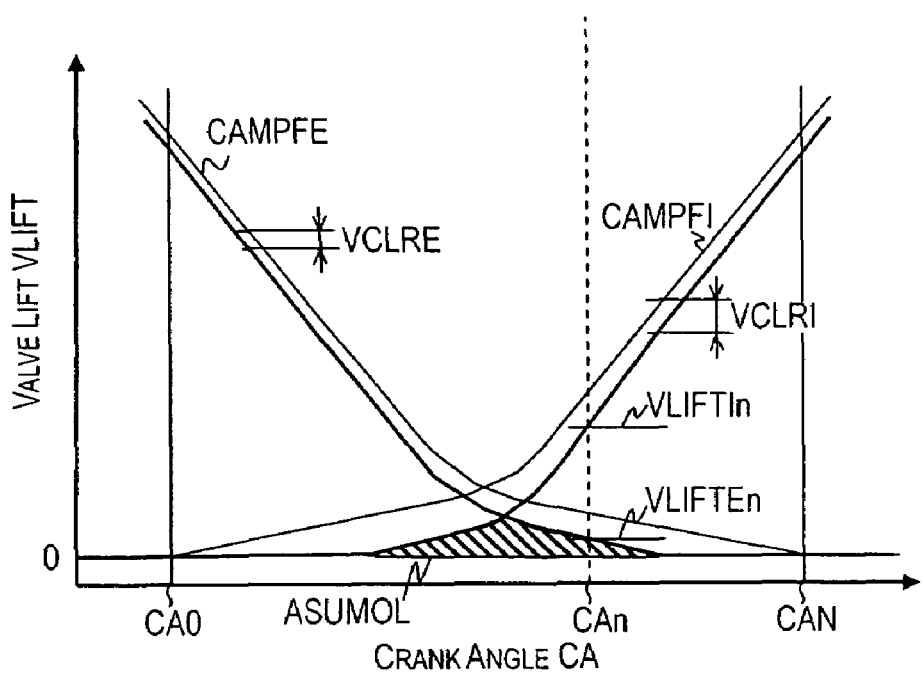
FIG. 8 is a graph that plots the valve lift versus the crank angle and that is used in the internal EGR quantity estimating device in accordance with the present invention.

FIGS. 7 and 8 show a pair of graphs plotting the valve operating characteristic value CAMPF and the valve lift VLIFT versus the crank angle CA, respectrively. The valve operating characteristic value CAMPF is the valve displacement ideally resulting from the cam profile and the valve lift VLIFT is the actual displacement obtained by subtracting the valve clearance VCLR from the valve operating characteristic value. Both the valve operating characteristic value CAMPF and the valve lift VLIFT use the closed valve state as a reference (i.e., both values are 0 when the valve is closed).

Figures 9, 10:
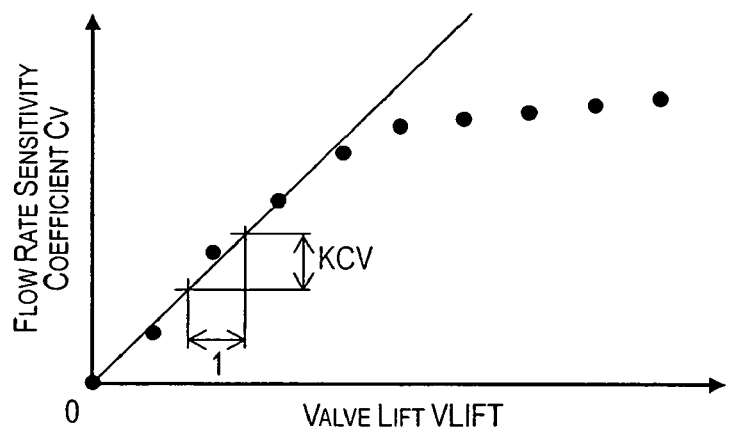
FIG. 9 is a graph that plots the flow rate sensitivity coefficient Cv versus the valve lift VLIFT and that is used in the internal EGR quantity estimating device in accordance with the present invention.
FIG. 10 illustrates the concept of the arrays created when the valve timing conditions are such that the maximum overlap is obtained.

In the present embodiment, the overlap period corresponding to the valve timing conditions that provide the maximum overlap is divided into a plurality of crank intervals of a prescribed crank angle DCA (1° in this embodiment) and the valve operating characteristic values CAMPFIn and CAMPFEn (where n=1 to N) of the intake valve 20 and the exhaust valve 23 corresponding to each interval are stored in the engine control unit 41. The valve operating characteristic values CAMPFIn and CAMPFEn inherently depend on the cam, and are adjusted as appropriate when the cam profile is changed. When the engine 1 is running, the valve clearances VCLRIn and VCLREn of the intake valve 20 and exhaust valve 23, respectively, are subtracted from the stored valve operating characteristic values CAMPFIn and CAMPFEn and the resulting valve lift values are used to calculate the interval cross sectional area opening VAREAI formed by the intake valve 20 and the interval cross sectional area opening VAREAE formed by the exhaust valve 23. The calculated interval cross sectional area openings VAREAI and VAREAE are stored in arrays (FIG. 10) configured to match each interval cross sectional area opening VAREAI and VAREAE to the respective interval to which it corresponds. The arrays of the interval cross sectional area openings VAREAI of the intake valve are equivalent to the "first array" and the arrays of the interval cross sectional area openings VAREAE of the exhaust valve 23 are equivalent to the "second array." In order to calculate the effective cross sectional area opening ASUMOL, the engine control unit 41 refers to the stored arrays, selects the smaller of the interval cross sectional area opening VAREAI of the intake valve and the interval cross sectional area opening VAREAE of the exhaust valve 23 corresponding to each interval as the effective interval cross sectional area opening VAREAn for that interval, and calculates the effective cross sectional area opening ASUMOL by integrating the selected interval cross sectional area openings VAREAn over the overlap period.

With the present invention, since the effective cross sectional area opening is calculated by dividing a prescribed time period that includes the overlap period into a plurality of intervals, calculating an interval cross sectional area opening for each interval, and integrating the calculated interval cross sectional area openings, the effect of any changes in valve clearance can be reflected accurately in the calculated effective cross sectional area opening. Also, since the cross sectional area opening per interval is integrated, the computer processing load can be curbed. Furthermore, since the interval cross sectional area openings of the intake valve and exhaust valve are arranged in arrays, the cross sectional area openings can be easily mapped to the appropriate intervals in order to accommodate changes in valve timing.

Figure 5:
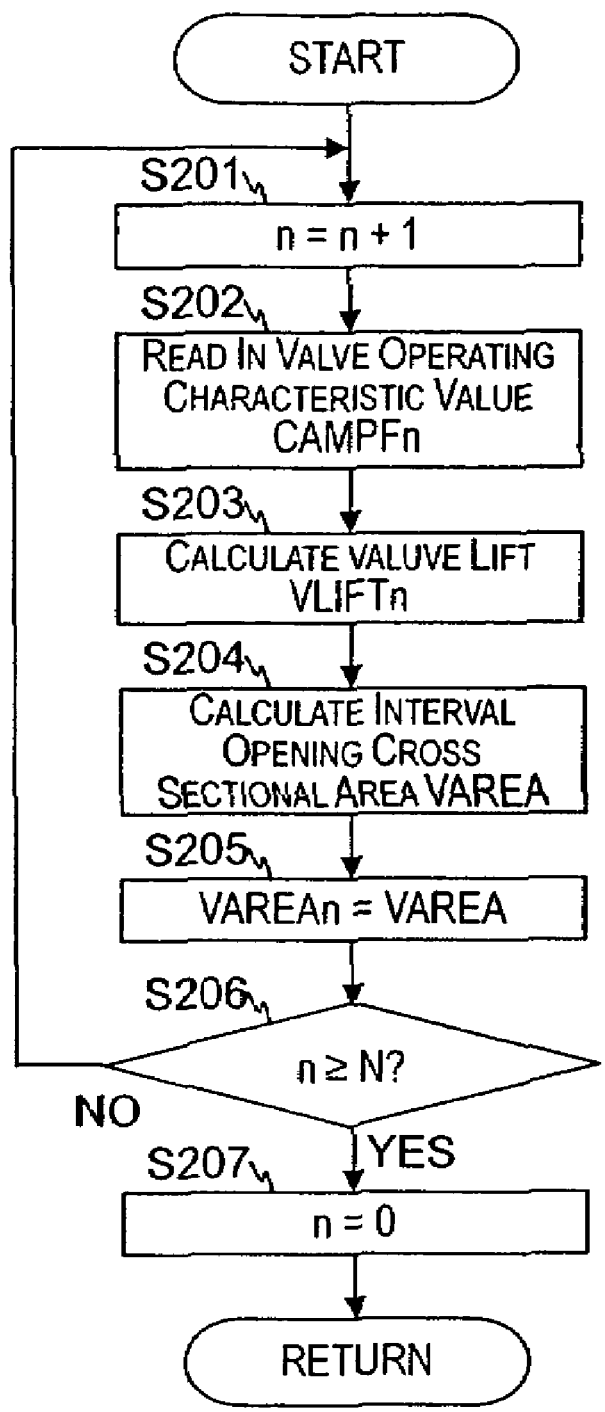
FIG. 5 is a flowchart of a cross sectional area opening routine for creating the cross sectional area opening arrays that are used in the internal EGR quantity estimating device in accordance with the present invention.

FIG. 5 shows a flowchart of a routine for creating a cross sectional area opening array. This routine is executed once per prescribed period of time.

In step S201, the engine control unit 41 is configured to add 1 to the column number indicating value n. The column number indicating value n is set to 0 each time the routine finishes creating an array.

In step S202, the engine control unit 41 reads the valve operating characteristic values CAMPFIn and CAMPFEn of the intake valve 20 and the exhaust valve 23 corresponding to the column number indicating value n.

In step S203, the engine control unit 41 subtracts the respective valve clearance values VCLRIn and VCLREn from the read valve operating characteristic value CAMPFIn and CAMPFEn to calculate the valve lifts VLIFTIn and VLIFTEn of the intake valve 20 and the exhaust valve 23.

The valve clearances VCLRIn and VCLREn are estimated based on the coolant temperature Tw and the exhaust temperature Tex.

$$VLIFTIn = CAMPFIn - VCLRIn \quad (10a)$$

$$VLIFTEn = CAMPFEn - VCLREn \quad (10b)$$

In step S204, the engine control unit 41 multiplies the calculated valve lifts VLIFTIn and VLIFTEn, respectively, by coefficients KCVI# and KCVE# corresponding to a flow rate sensitivity coefficient Cv and the valve body projection areas VAREAI0# and VAREAE0# of the intake valve 20 and the exhaust valve 23, thereby calculating the interval cross sectional area opening VAREAI of the intake valve 20 and the interval cross sectional area opening VAREAE of the exhaust valve 23. The flow rate sensitivity coefficient is expressed as the ratio of the theoretical flow rate and the actual flow rate corresponding to the valve lift VLIFT, and is approximately proportional to the valve lift VLIFT in the low lift region occurring when the valve open periods overlap (see FIG. 9). The coefficients KCVI# and KCVE# are calculated as the slope of the approximately straight line formed by the flow rate sensitivity coefficient Cv (FIG. 9), and are stored as fixed values in the engine control unit 41. Additionally, in the equations, a and b indicate he number of intake valves 20 or exhaust valves 23 provided per cylinder and VDI and VDE indicates the seat contact diameter of the intake valve 20 or exhaust valve 23.

$$VAREAI = VLIFTIn \times KCVI\# \times VAREAI0\# \times a \quad (11a)$$

$$VAREAE = VLIFTEn \times KCVE\# \times VAREAE0\# \times b \quad (11b)$$

$$VAREAI0\# = (VDI/2)^2 \times \pi \quad (12a)$$

$$VAREAE0\# = (VDE/2)^2 \times \pi \quad (12b)$$

In step S205, the engine control unit 41 stores the calculated interval cross sectional area openings VAREAI and VAREAE in correspondence to the column number indicating value n.

$$VAREAIn = VAREAI \quad (13a)$$

$$VAREAEn = VAREAE \quad (13b)$$

In step S206, the engine control unit 41 is configured to determine if the column number indicating value n has reached the final column number N. If it has, the engine control unit 41 proceeds to step S207. If not, the engine control unit 41 returns to step S201 and calculates and stores the interval cross sectional area openings VAREAI and VAREAE of the next column.

In step S207, the engine control unit 41 then sets the column number indicating value n to 0.

Figure 6:
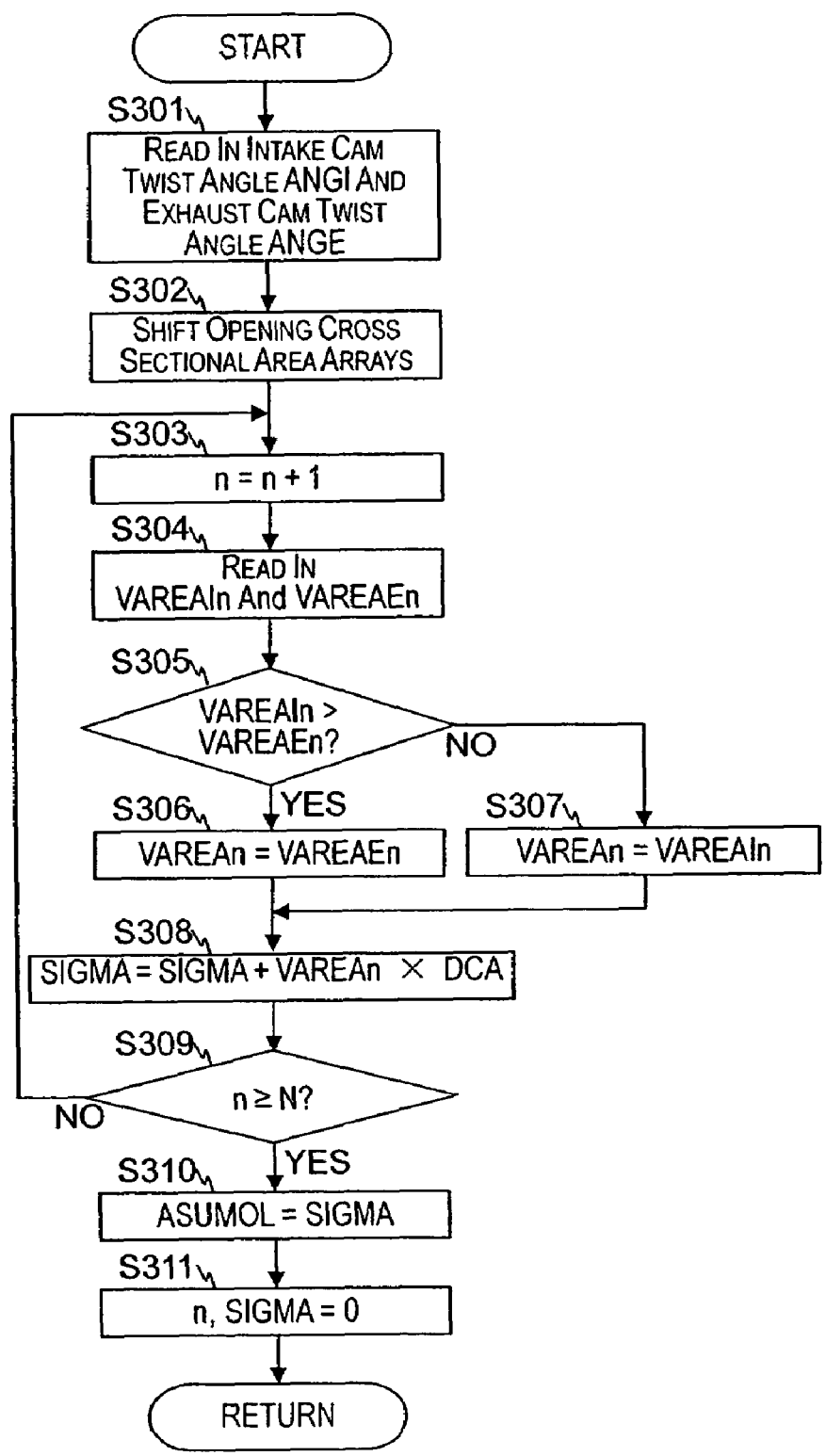
FIG. 6 is a flowchart of an effective cross sectional area opening routine for computing the effective cross sectional area opening that is used in the internal EGR quantity estimating device in accordance with the present invention.

FIG. 6 is a flowchart of a routine for computing the effective cross sectional area opening.

In step S301, the engine control unit 41 reads in the intake cam twist angle ANGI and the exhaust cam twist angle ANGE.

Figure 11:
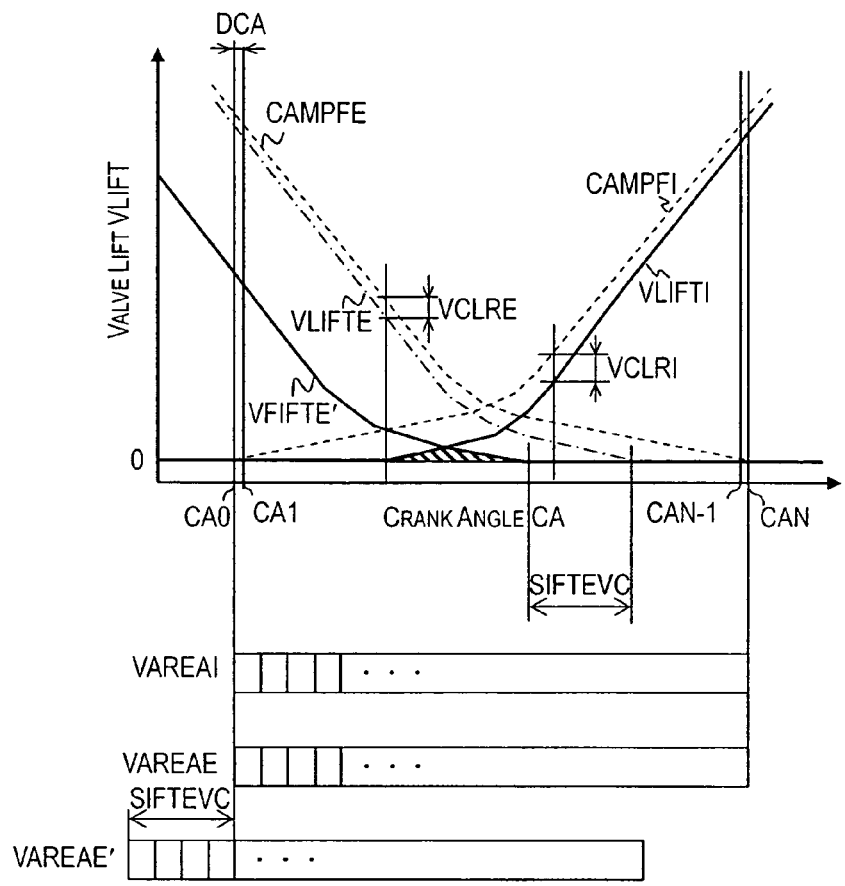
FIG. 11 illustrates the concept of setting the arrays in accordance with the actual valve timing.

In step S302, based on the cam twist angles ANGI and ANGE, the engine control unit 41 shifts the array of interval cross sectional area openings VAREAE of the exhaust valve 23 relative to the array of interval cross sectional area openings VAREAI of the intake valve 20 so as to adapt to the current overlap period. More specifically, based on the cam twist angles ANGI and ANGE, the engine control unit 41 calculates the relative change amount SIFTEVC in the exhaust valve close timing with respect to the intake valve opening timing in comparison to the valve timing conditions that provide the maximum overlap and shifts the array of interval cross sectional area openings VAREAE of the exhaust valve 23 with respect to the array of interval cross sectional area openings VAREAI of the intake valve 20 by the calculated relative change amount SIFTEVC (see FIG. 11). For example, if the intake valve opening timing and the exhaust valve close timing change by crank angles of 30° and 10°, respectively, compared to conditions of maximum overlap, the relative change amount will be 40° and the array of interval cross sectional area openings VAREAE of the exhaust valve 23 is advanced by a number of columns corresponding to the 40°, i.e., 40 columns in this embodiment because the overlap period is divided into intervals of 1° in order to make the arrays.

In step S303, the engine control unit 41 adds 1 to the column number indicating value n.

In step S304, the engine control unit 41 retrieves the interval cross sectional area openings VAREAIn and VAREAEn corresponding to the column number indicating value n from the array of interval cross sectional area openings VAREAI of the intake valve 20 and the advanced array of interval cross sectional area openings VAREAE of the exhaust valve 23.

In step S305, the engine control unit 41 is configured to determine if the interval cross sectional area opening VAREAIn of the intake valve 20 is larger than the retrieved interval cross sectional area opening VAREAEn of the exhaust valve 23. If so, the engine control unit 41 proceeds to step S306. If not, it proceeds to step S307.

In step S306, the engine control unit 41 sets the interval cross sectional area opening VAREAEn of the exhaust valve 23 as the effective interval cross sectional area opening VAREAn for that interval.

In step S307, the engine control unit 41 sets the interval cross sectional area opening VAREAIn of the intake valve 20 as the effective interval cross sectional area opening VAREAn for that interval.

In step S308, the engine control unit 41 is configured to integrate the interval cross sectional area opening VAREAn calculated for each interval over the overlap period.

$$SIGMA = SIGMA + VAREAn \times DCA \quad (14)$$

In step S309, the engine control unit 41 is configured to determine if the column number indicating value n has reached the final column number N. If so, the engine control unit 41 proceeds to step S310. If not, the engine control unit 41 returns to step S303 and calculates the interval cross sectional area opening VAREAn of the next column.

In step S310, calculated integral value SIGMA is set as the effective cross sectional area opening ASUMOL.

$$ASUMOL = SIGMA \quad (15)$$

In step S311, the engine control unit 41 sets the column number indicating value n and the integral value SIGMA to 0.

Although in this embodiment the effective cross sectional area opening ASUMOL is calculated by integrating the interval cross sectional area openings VAREAn over the overlap period, it is also acceptable to terminate the selection of interval cross sectional area openings VAREAn and the calculation of the integral at the point when the exhaust valve lift VLIFTE of the exhaust valve 23 reaches 0.

The calculated effective opening area ASUMOL is used in the previously described internal EGR estimating routine to compute the blow-by gas quantity MRESOL (step S112).

Figure 12:
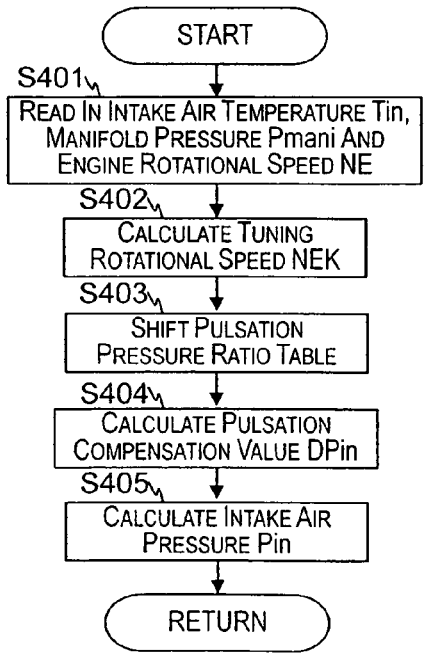
FIG. 12 is a flowchart of a routine for detecting the intake air pressure.

The detection of the intake pressure Pin will now be explained. FIG. 12 is a flowchart of an intake pressure detection routine.

Figure 13:
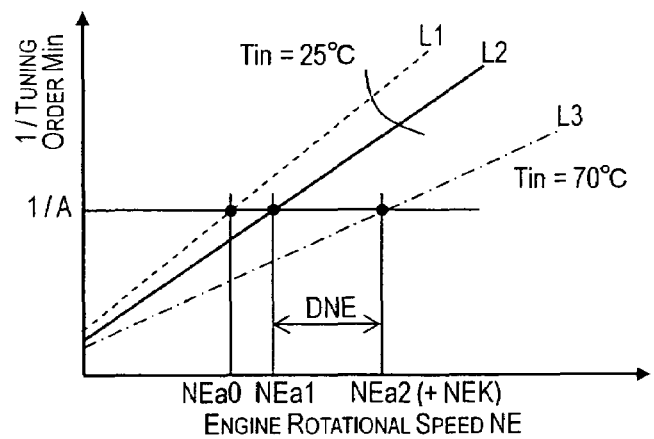
FIG. 13 is a graph that shows the characteristic line of the tuning order Min.
Figure 15:
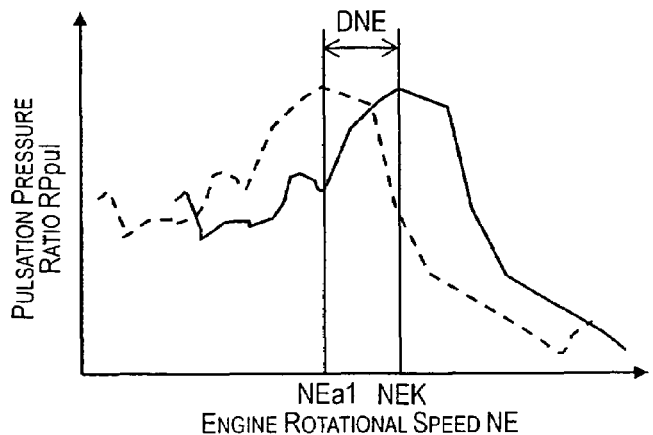
FIG. 15 is a graph or map that is used for computing the pulsation pressure ratio.

The tuning order map shown in FIG. 13 and the pulsation pressure ratio map shown in FIG. 15 are stored in the engine control unit 41. The engine control unit 41 calculates the amount of change DNE in the tuning rotational speed NEK corresponding to the actual operating conditions (intake pressure Pin in this embodiment), shifts the pulsation pressure ratio RPpul by the calculated amount of change DNE relative to the engine rotational speed NE axis, and calculates the actual pulsation pressure ratio RPpul by referring to the shifted pulsation pressure ratio map. The engine control unit 41 then converts the calculated pulsation pressure ratio RPpul into a pulsation compensation value DPin and adds the pulsation compensation value DPin to the detected manifold pressure Pmani, thereby calculating the intake pressure Pin corresponding to the overlap center timing OLCTR (i.e., the manifold pressure Pmani is corrected to take into account the amount of pressure change resulting from pulsation).

The maps mentioned above will now be described in more detail.

The tuning order map is obtained by correcting a theoretical equation for the tuning order Min0 at a reference intake air temperature (e.g., Tin=25° C.) according to the results of a calculation or an experiment. The dotted straight line L1 in FIG. 13 is the inverse of the theoretical tuning order Min0 at the reference temperature and is given by the following equation.

$$\frac{1}{Min0} = \left(\frac{1}{(120 \times Fin)}\right) \times NE \quad (16)$$

In the equation (16), Fin is the fundamental frequency for the air column vibrations inside the intake passage. The fundamental frequency Fin is calculated using the equation (17) shown below based on the equivalent length Le of the intake passage 11 and the speed of sound Spsd. In the equation (18), Lin is the actual pipe length of the intake air passage 11 and DL is an open end correction value. In the equation (19), the term Kair is the specific heat ratio and the term Rair is the gas constant.

$$Fin = \frac{Spsd}{(2 \times Le)} \quad (17)$$

$$Le = 2(Lin + DL) \quad (18)$$

$$Spsd = \sqrt{\kappa air \times Rair \times Tin} \quad (19)$$

Figure 14:
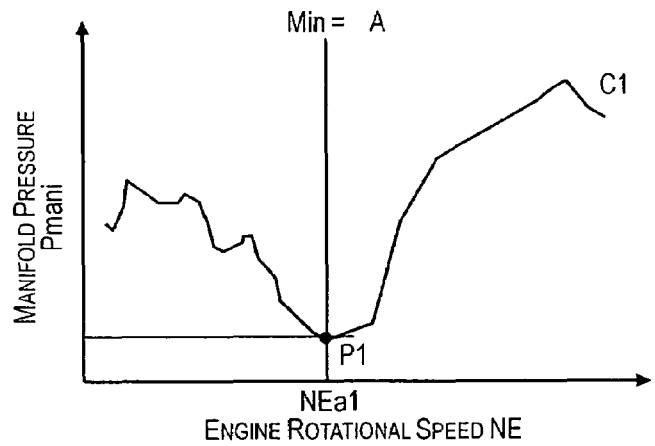
FIG. 14 is a graph that plots the manifold pressure Pmani versus the engine rotational speed NE.

The manifold pressure Pmain is detected and plotted with respect to the engine rotational speed to obtain a characteristic curve C1 (FIG. 14). The point P1 of the characteristic curve C1 corresponding to a tuning order Min of A is found and the engine rotational speed NEa1 at point P1 is determined. The engine rotating speed NEa0 corresponding to the point along the straight line L1 of FIG. 13 where 1/Min0 equals 1/A is determined and the slope of the theoretical equation (16) is corrected according to the equation (20) below (thereby obtaining the straight line L2). The engine rotational speed NEa1 at the point P1 can also be identified based on a manifold pressure obtained from a theoretical calculation.

$$\frac{1}{Min} = \left(\frac{1}{(120 \times Fin)}\right) \times \left(\frac{NEa0}{NEa1}\right) \times NE \quad (20)$$

The equation (20) is converted into a map and stored in the engine control unit 41 as a tuning order map. The characteristic curve of the tuning order Min can also be stored as a function instead of a map.

Meanwhile, the pulsation pressure ratio map is set as follows. A theoretical calculation is used to determine the manifold pressure Pincl (=Pinctr) at the overlap center timing OLCTR with the contribution of pressure pulsation taken into account as a function of the engine rotational speed. The calculation is based on the assumptions that the temperature of the engine 1 is at equilibrium, the intake air temperature is at the reference intake air temperature, and the external air pressure is at atmospheric pressure. The amounts by which the calculated manifold pressures Pincl deviate from the detected manifold pressures Pmani are converted into a map of pulsation pressure ratios RPpul and stored in the engine control unit 41. The overlap period OLPRD used in the calculation of the manifold pressure Pincl is set for each engine rotational speed (FIG. 16) based on the operating state of the variable valve mechanisms 25 and 26 under the actual operating conditions of the engine 1.

$$RPpul = \left(\frac{(Pincl - Pmani)}{Pmani}\right) \quad (21)$$

In step S401, the engine control unit 41 reads in the intake air temperature Tin, the manifold pressure Pmani, and the engine rotational speed NE.

In step S402, the engine control unit 41 calculates the tuning rotational speed NEK at the actual operating conditions. More specifically, the engine control unit 41 calculates the tuning order characteristic line (line L3 in FIG. 13) corresponding to the detected intake air temperature Tin (e.g., 70° C.) using the equations (17) to (20) and finds the engine rotational speed NEa2 corresponding to the point along the calculated characteristic line where 1/Min equals 1/A. The engine control unit 41 sets the engine rotational speed NEa2 as the tuning rotational speed NEK. The tuning order Min used in calculating the tuning rotational speed NEK is selected in consideration of a practical operating region.

In step S403, the engine control unit 41 calculates the difference DNE between the tuning rotational speed NEK (=NEa2) and the engine rotational speed NEa1 corresponding to a tuning order Min of A under conditions of the reference intake air temperature and shifts the pulsation pressure ratio map (FIG. 15) by an amount equal to the calculated difference DNE.

In step S404, the engine control unit 41 calculates the pulsation compensation value DPin using the shifted pulsation pressure ratio map (hereinafter called the "corrected pulsation pressure ratio map"). The pulsation compensation value DPin is calculated by reading the pulsation pressure ratio RPpul corresponding to the current engine rotational speed NE from the corrected pulsation pressure ratio map and multiplying the pulsation pressure ratio RPpul by the manifold pressure Pmani.

$$DPin = RPpul \times Pmani \quad (22)$$

In step S405, the engine control unit 41 calculates the intake air pressure Pin by adding the calculated pulsation compensation value DPin to the manifold pressure Pmani.

$$Pin = Pmani + DPin \quad (23)$$

The calculated intake air pressure Pin is used as the representative intake air pressure for the overlap period in the previously described internal EGR quantity estimating routine. More specifically, Pin is used to calculate the blow-by gas flow velocity Vblow (steps S108 to S111).

In this embodiment, step S101 (detection of the intake air pressure Pin and the exhaust gas pressure Pex) and steps S103 to S112 of the flowchart shown in FIG. 2 constitute a blow-by gas quantity calculating section. Step S102 of the flowchart shown in FIG. 2 constitutes a residual gas calculating section. Also, step S113 of the flowchart shown in FIG. 2 an internal EGR quantity calculating section. The entirety of the flowcharts shown in FIGS. 5 and 6 constitute an effective cross sectional area opening calculating section. The entire flowchart shown in FIG. 12 constitutes an intake air pressure detecting section. Step S101 of the flowchart shown in FIG. 2 constitutes an exhaust gas pressure detecting section.

This embodiment can provide the following effects.

Firstly, since the overlap period corresponding to the valve timing conditions that provide the maximum overlap is divided into a plurality of intervals of a prescribed crank angle DCA and the effective cross sectional area opening ASUMOL is calculated by calculating the effective cross sectional area opening at each interval (i.e., the interval cross sectional area opening VAREA) and integrating the calculated interval cross sectional area openings VAREA, any changes in the actual valve lift VLIFT caused by changes in the valve clearance are reflected in the calculated values of the interval cross sectional area openings VAREAn. As a result, an accurate effective cross sectional area opening ASUMOL can be calculated.

Secondly, since the effective cross sectional area opening ASUMOL is calculated by integrating the interval cross sectional area openings VAREAn, the effective cross sectional area opening ASUMOL can be calculated with substantially the same degree of precision as when it is calculated in a continuous manner based on the cam profile while reducing the computational processing load in comparison with the continuous calculation.

Thirdly, since the interval cross sectional area openings VAREAI and VAREAE of the intake and exhaust valves are arranged into arrays, which are shifted relative to each other by an amount corresponding to the change in valve timing when the valve timing is changed, it is not necessary to compute the interval cross sectional area openings VAREAI and VAREAE again based on the new valve timing and various valve timings can be readily accommodated.

Fourthly, since the blow-by gas quantity MRESOL is calculated using a theoretical computation based on the intake and exhaust pressures Pin and Pex during the overlap period and the effective cross sectional area opening ASUMOL, the blow-by gas quantity can be calculated in a simple and accurate manner regardless of the operating conditions. As a result, an internal EGR quantity can be estimated accurately.

Fifthly, since the intake air pressure Pinctr corresponding to a prescribed timing during the overlap period (i.e., the overlap center timing OLCTR) is used as a representative intake air pressure when calculating the blow-by gas quantity MRESOL, the first effect described in the previous paragraph can be achieved with a small computer processing load.

Sixthly, the re-adaptation that is required when a cam profile or port shape is changed (i.e., the resetting of values related to said shapes, such as the valve operating characteristic value CAMPF) can be accomplished easily.

Seventhly, in this embodiment, a map of pulsation pressure ratios RPpul corresponding to a reference intake air temperature is prepared in advance and is shifted in accordance with the actual intake air temperature Tin to obtain a corrected pulsation pressure ratio map. Since the pulsation compensation value DPin is calculated using the corrected pulsation pressure ratio map, it is not necessary to prepare a separate pulsation pressure ratio map for each temperature.

Although the embodiment described heretofore assumes that the cam profile is fixed and that the overlap period is changed only as a result of changing the valve timing, the present invention is not limited to such an arrangement and can also be applied to an arrangement in which the overlap period is changed as a result of changing the cam profile.

Also, although in the embodiment the intake air pressure Pin corresponding to the point in time when the cross sectional area openings of the intake valve 20 and the exhaust valve 23 are equal is detected and used as the representative intake air pressure when calculating the blow-by gas quantity MRESOL, it is also acceptable to detect the intake air pressure Pin corresponding to a substantially central point in time during the overlap period and use that intake air pressure Pin as the representative intake air pressure.

As used herein to describe the above embodiments, the term "detect" as used herein to describe an operation or function carried out by a component, a section, a device or the like includes a component, a section, a device or the like that does not require physical detection, but rather includes determining, estimating or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal EGR parameter estimating device comprising:
    an interval calculating section configured to set a prescribed time period and to divide the prescribed time period into a plurality of intervals that includes an overlap period in which an intake valve and an exhaust valve are both open in a single cylinder;

an interval cross sectional area opening calculating section configured to calculate an interval cross sectional area opening of a-blow-by gas passage formed between an intake port and an exhaust port during the overlap period for each of the intervals based on a predetermined valve operating characteristic value;

a cross sectional area opening integrating section configured to integrate the interval cross sectional area openings over the overlap period; and an effective cross sectional area opening calculating section configured to calculate an effective cross sectional area opening of the blow-by gas passage over the overlap period based on integration of the interval cross sectional area openings.

2. The internal EGR parameter estimating device according to claim 1, further comprising:

an exhaust gas pressure detecting section configured to detect an exhaust gas pressure during the overlap period, an intake air pressure detecting section configured to detect an intake air pressure during the overlap period, and a blow-by gas quantity calculating section configured to calculate a quantity of blow-by gas that blows between the exhaust port and the intake port during the overlap period based on at least the exhaust gas pressure and the intake air pressure and the effective cross sectional area opening.

3. The internal EGR parameter estimating device according to claim 2, further comprising an internal EGR calculating section configured to calculate an internal EGR quantity based on the blow-by gas quantity.

4. The internal EGR parameter estimating device according to claim 3, further comprising a residual gas quantity calculating section configured to calculate a residual gas quantity of exhaust gas that remains in the cylinder during the period when the exhaust valve is closed, the internal EGR quantity calculating section being configured to calculate the internal EGR quantity based on the blow-by gas quantity calculated by the blow-by gas quantity calculating section and the residual gas quantity calculated by the residual gas quantity calculating section.

5. The internal EGR parameter estimating device according to claim 4, wherein the residual gas quantity calculating section includes a pressure detecting section configured to detect pressure inside the cylinder during a period when the exhaust valve is closed, a temperature detecting section configured to detect the temperature inside the cylinder during the period when the exhaust valve is closed, a cylinder volume detecting section configured to detect effective cylinder volume during the period when the exhaust valve is closed, and a calculating section configured to calculate a gas constant of the exhaust gas corresponding to an air-fuel ratio of an air-fuel mixture and to calculate the residual gas quantity based on the pressure detected inside the cylinder, the temperature detected inside the cylinder, the cylinder volume and the calculated gas constant.

6. The internal EGR parameter estimating device according to claim 4, wherein the internal EGR quantity calculating section is configured to calculate the internal EGR quantity as the sum of the blow-by gas quantity and the residual gas quantity.

7. The internal EGR parameter estimating device according to claim 3, wherein the effective cross sectional area opening calculating section is further configured to create a first array of interval cross sectional area openings formed by the intake valve and a second array of interval cross sectional area openings formed by the exhaust valve such that each of the interval cross sectional area opening of each of the first and second arrays correspond to a specific interval, the effective cross sectional area opening calculating section is further configured to select a smaller of two of the interval cross sectional area openings from the first and second arrays for each of the intervals as an effective interval cross sectional area opening for that one of the intervals, and the effective cross sectional area opening calculating section is further configured to calculate the effective cross sectional area opening by integrating the effective interval cross sectional area openings that was selected over the overlap period.

8. The internal EGR parameter estimating device according to claim 7, wherein the effective cross sectional area opening detecting section is further configured such that when a close timing of the exhaust valve changes with respect to an open timing of the intake valve due to an adjustment of a valve open timing of at least one of the intake and exhaust valves, the second array is shifted with respect to the first array by an amount corresponding to an amount of change and a smaller of two of the interval cross sectional area openings from the first and second arrays for each of the intervals is selected as the effective interval cross sectional area opening for that one of the intervals.

9. The internal EGR parameter estimating device according to claim 3, wherein the interval calculating section is further configured to divide the prescribed period into the intervals in terms of one degree of the crank angle.

10. The internal EGR parameter estimating device according to claim 3, further comprising a temperature detecting section configured to detect exhaust gas temperature with the blow-by gas quantity calculating section being further configured to use the exhaust gas temperature in calculating the blow-by gas quantity.

11. The internal EGR parameter estimating device according to claim 2, wherein the intake air pressure section is further configured to detect the intake air pressure at a point in time within the overlap period that corresponds to a substantially central point in time during the overlap period as the representative intake air pressure for the overlap period.

12. The internal EGR parameter estimating device according to claim 2, further comprising the exhaust gas pressure section is further configured to detect the exhaust gas pressure at a point in time within the overlap period that corresponds to a substantially central point in time during the overlap period as a representative exhaust gas pressure for the overlap period.

13. The internal EGR parameter estimating device according to claim 2, wherein
the intake air pressure section is further configured to detect the intake air pressure at a point in time when a first cross sectional area opening formed by the intake valve and a second cross sectional area opening formed by the exhaust valve are equal as the representative intake air pressure for the overlap period.

14. The internal EGR parameter estimating device according to claim 13, wherein
the exhaust gas pressure section is further configured to detect the exhaust gas pressure at the point in time within the overlap period that corresponds to when the first and second cross sectional area openings are equal as a representative exhaust gas pressure for the overlap period.

15. The internal EGR parameter estimating device according to claim 3, further including
a residual gas quantity calculating section configured to calculate a residual gas quantity of exhaust gas that remains in the cylinder during the period when the exhaust valve is closed,
the internal EGR quantity calculating section being configured to calculate the internal EGR quantity based on the blow-by gas quantity calculated by the blow-by gas quantity calculating section and the residual gas quantity calculated by the residual gas quantity calculating section.

16. The internal EGR parameter estimating device according to claim 3, wherein
the intake air pressure detecting section is configured to:
include a set of intake air pressure-related fundamental pulsation compensation values arranged as a function of engine rotational speed and set under conditions of a reference intake air temperature;
detect intake air pressure at several periods of time during the overlap period to obtain an average intake air pressure value;
shift the fundamental pulsation compensation value by an amount of change of a tuning rotational speed corresponding to an actual operating conditions and then calculate an actual pulsation compensation value; and
correct the average intake air pressure value using the calculated pulsation compensation value to set the representative intake air pressure for the overlap period.

17. An internal EGR parameter estimating device comprising:
interval calculating means for setting a prescribed time period and for dividing the prescribed time period into a plurality of intervals that includes an overlap period in which an intake valve and an exhaust valve are both open in a single cylinder;
interval cross sectional area opening calculating means for calculating an interval cross sectional area opening of a-blow-by gas passage formed between an intake port and an exhaust port during the overlap period for each of the intervals based on a predetermined valve operating characteristic value;
cross sectional area opening integrating means for integrating the interval cross sectional area openings over the overlap period; and
effective cross sectional area opening calculating means for calculating an effective cross sectional area opening of the blow-by gas passage over the overlap period based on integration of the interval cross sectional area openings.

18. A method of estimating an internal EGR parameter comprising:
setting a prescribed time period that includes an overlap period in which an intake valve and an exhaust valve are both open in a single cylinder;
dividing the prescribed time period into a plurality of intervals;
calculating an interval cross sectional area opening of a-blow-by gas passage formed between an intake port and an exhaust port during the overlap period for each of the intervals based on a predetermined valve operating characteristic value;
integrating means for integrating the interval cross sectional area openings over the overlap period; and
calculating an effective cross sectional area opening of the blow-by gas passage over the overlap period based on integration of the interval cross sectional area openings.

* * * * *